United States Patent [19]

Hanna

[11] 4,274,853
[45] Jun. 23, 1981

[54] METHOD AND APPARATUS FOR THE PRODUCTION OF GLASS FIBERS

[75] Inventor: Terry J. Hanna, Newark, Ohio

[73] Assignee: Owens-Corning Fiberglas Corporation, Toledo, Ohio

[21] Appl. No.: 86,897

[22] Filed: Oct. 22, 1979

[51] Int. Cl.³ .............................................. C03B 37/02
[52] U.S. Cl. ........................................ 65/2; 65/11 W; 65/12
[58] Field of Search ............. 65/1, 2, 12, 11 R, 11 W, 65/3 R, 3 C

[56] References Cited

U.S. PATENT DOCUMENTS

| | | | |
|---|---|---|---|
| 3,649,231 | 3/1972 | Trethewey | 65/2 |
| 3,986,853 | 10/1976 | Coggin et al. | 65/12 X |
| 4,003,730 | 1/1977 | Brady et al. | 65/1 |
| 4,149,865 | 4/1979 | Coggin et al. | 65/12 X |
| 4,171,212 | 10/1979 | Shono et al. | 65/12 X |

Primary Examiner—Robert L. Lindsay, Jr.
Attorney, Agent, or Firm—Ronald C. Hudgens; Kenneth H. Wetmore; Philip R. Cloutier

[57] ABSTRACT

The invention relates to method and apparatus for producing fibers from heat-softened mineral material, such as glass. More specifically, this invention relates to method of and apparatus for glass fiber production using a bushing of the type having an orifice plate with a plurality of closely-spaced orifices and a flat exterior surface comprising moving a receiving member into spaced-apart relationship immediately below the orifice plate of the bushing, flowing heat-softened glass through the orifice plate to form a body of heat-softened glass between the receiving member and the orifice plate and in contact with the receiving member, and moving the receiving member with the body of glass from the orifice plate at a rate effective to form fibers.

12 Claims, 5 Drawing Figures

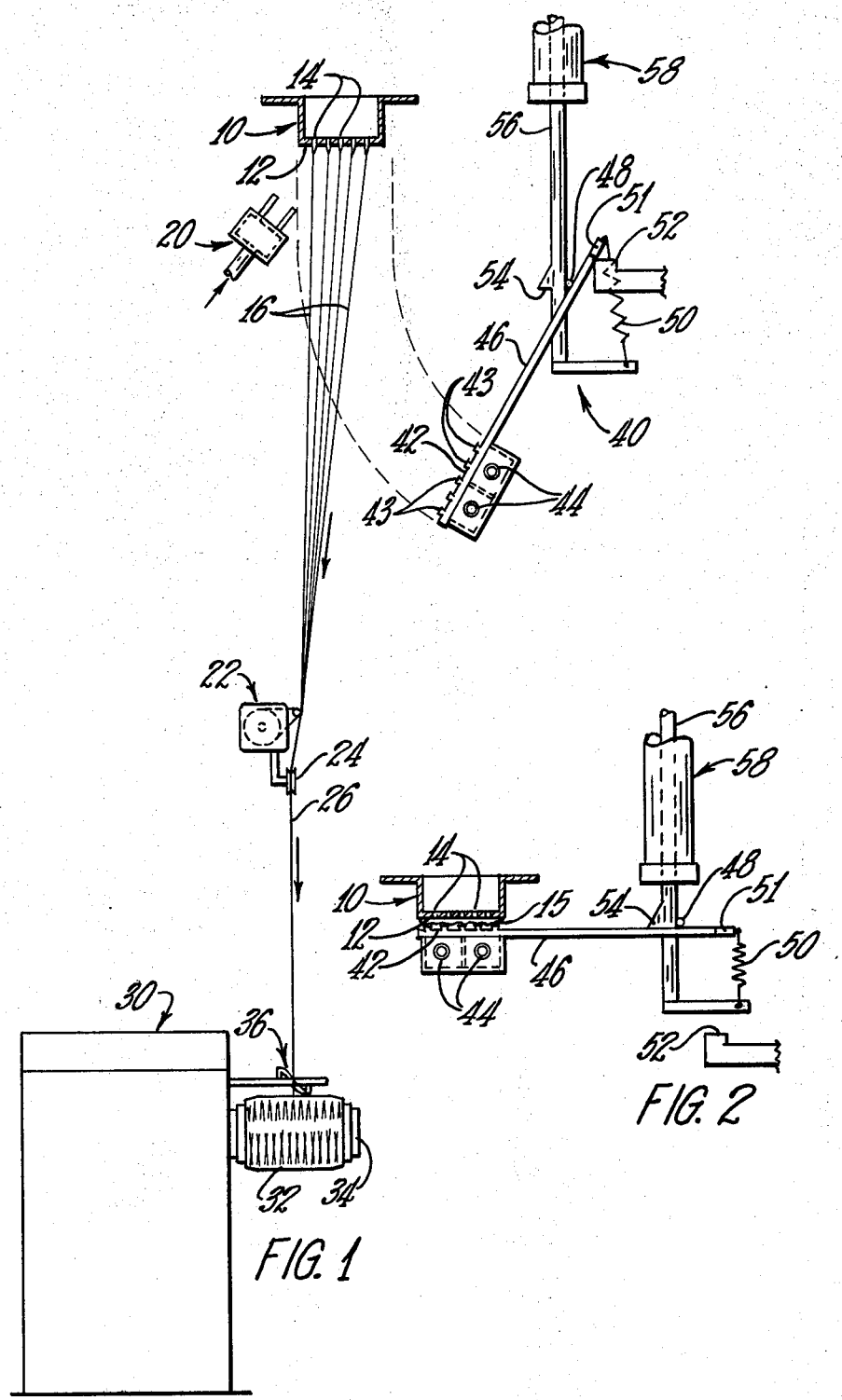

METHOD AND APPARATUS FOR THE PRODUCTION OF GLASS FIBERS

TECHNICAL FIELD

The invention relates to method and apparatus for producing fibers from heat-softened mineral material, such as glass. More specifically, this invention relates to a method of, and apparatus for, the production of glass fibers using a bushing with an orifice plate having a plurality of closely-spaced orifices and a flat exterior surface. The method comprises moving a receiving member into spaced-apart relationship immediately below the orifice plate of the bushing, flowing heat-softened glass through the orifice plate to form a body of heat-softened glass in contact with the receiving member and the orifice plate, and moving the receiving member and the body of glass from the orifice plate at a rate effective to form fibers. The apparatus comprises a receiving member and means for carrying out the steps described in the method above.

BACKGROUND ART

It has been conventional in the glass fiber forming art to use bushings having orificed projections to flow streams of molten glass material for attenuation into fibers. By using such orificed projections, the undersurface or tip plate of such bushings were less likely to flood with molten glass material during interruption of the fiber forming process. During interruption of the process a tipped bushing will form beads of glass at the exit of each tip rather than forming a large mass of glass covering the entire undersurface of the bushing as in a complete flood.

However, by using bushings which include tips or orificed projections, one is physically limited by the walls of the tips to certain orifice densities in the bottom wall. If the tips or projections can be eliminated from the bottom surface of the bushing, the orifices can be packed more closely together, and thus, higher orifice density bushings can be utilized.

However, utilization of such high orifice density tipless bushings has been limited because of the difficulty of restarting the fiber forming process after an interruption. When the fiber forming process is interrupted when using such a bushing, the undersurface of the bushing quickly floods with molten glass material. Improvement is desired in the method and apparatus for for restarting such bushings after a process interruption.

SUMMARY OF THE INVENTION

The present invention comprises a method of glass fiber production using a bushing of the type having an orifice plate with a plurality of closely-spaced orifices and a flat exterior surface. The method comprises moving a receiving member into spaced-apart relationship immediately below the orifice plate of the bushing, flowing heat-softened glass through the orifice plate to form a body of heat-softened glass between the receiving member and the orifice plate and in contact with the receiving member and moving the receiving member with the body of glass from the orifice plate at a rate effective to form fibers.

The present invention comprises apparatus for glass fiber production from a bushing of the type having an orifice plate with a plurality of closely-spaced orifices and a flat undersurface. The apparatus comprises a receiving member, means for moving the receiving member into spaced-apart relationship immediately below the orifice plate of the bushing, means for flowing heat-softened glass through the orifice plate to form a body of heat-softened glass between the receiving member and the orifice plate and in contact with the receiving member and means for moving the receiving member with the body of glass from the orifice plate at a rate effective to form fibers.

The present invention comprises a method of manufacturing glass fibers from a tipless bushing having an orifice area with a plurality of orifices in flooding relationship. The method comprises moving a plate adapted with a glass-engaging surface into a position below the bushing such that the surface and the orifice area are in spaced apart relationship, flowing glass through the orifices into engaging contact with the surface, the glass forming a body which generally fills the space between the surface and the orifice area, and moving the plate with the body of glass away from the orifice area to attenuate fibers from the bushing.

An object of the invention is to provide an improved method and apparatus for the production of glass fibers.

Another object of the invention is to provide an improved method and apparatus for start-up of production of glass fibers from a tipless bushing.

These and other objects of the invention will become more apparent as the invention is described hereinafter in detail with reference to the accompanying drawings.

DESCRIPTION OF THE DRAWINGS

FIG. 1 is a semi-schematic elevational view of a fiber forming apparatus embodying the invention.

FIG. 2 is a semi-schematic elevational view of a fiber forming apparatus after a production interruption embodying the invention.

DESCRIPTION OF THE PREFERRED EMBODIMENT

Figure 3:
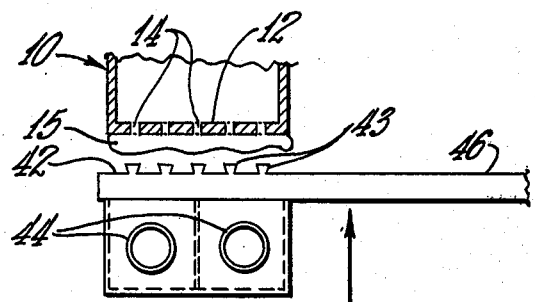
FIG. 3 is a side elevational view of the start-up device positioned below a bushing.

It is to be understood the invention is not limited in its application to the details of construction and arrangement of the parts illustrated in the accompanying drawings, since the invention is capable of other embodiments and of being practiced or carried out in various ways to produce elements for other end uses. Also, it is to be understood that the phraseology employed herein is for the purpose of description and not of limitation.

While the method and apparatus of the invention have particular utility in the processing of glass for forming fibers or filaments, it is to be understood that the method and apparatus can be employed for producing fibers of other materials.

Referring to the drawings in detail, FIG. 1 illustrates a fiber forming operation. Mineral material, such as glass, is maintained in a molten condition in bushing or stream feeder assembly 10 from which a plurality of streams of heat-softened glass is emitted for attenuation into fibers. The bushing comprises a bottom wall or orifice plate 12 having a plurality of orifices 14 therein. The orifices of tipless bushing are in close, compact relationship. During an interruption of the fiber forming process, the heat-softened material flows through the orifices and floods the flat undersurface of the bushing.

During operation of the manufacturing process, filaments 16 are attenuated from the streams of glass emitted from orifices 14. Blower assembly 20 directs a cooling fluid, such as air, toward the bushing to control the fiber forming environment. Glass fibers 16 are attenuated from cones of molten glass by winder apparatus 30. The fibers are coated by size applicator 22 and gathered into strand 26 by gathering shoe 24. The strand is reciprocated by traverse 36 as it is collected into package 32 on winder collet 34.

FIG. 1 shows the glass fiber forming apparatus in production. Start-up device 40 is in its retracted position so that it does not interfer with normal production.

As shown, the start-up device has a receiving member at the end of rod 46. The receiving member comprises a plate 42 with a roughened or knurled surface 43. The receiving member is cooled by water tubes 44. As seen in FIG. 1, the receiving member or plate is movably mounted. The end 51 of rod 46 is biased by spring 50. As air cylinder or hydraulic cylinder 58 moves rod 56 upwardly, the biased spring 50 rotates rod 46 around point 48 until the rod comes to rest against stop 54. When rod 46 is against stop 54, a receiving member is in position below the orifice section of the bushing. Cylinder 58 continues to move rod 56 and to move the receiving member vertically into position immediately below the orifice area. During this vertical movement of the receiving member, the receiving member and the orifice area of the bushing are generally in parallel relationship. The receiving member can be moved to within any suitable distance from the orificed area of the bushing. Preferably the receiving member will move to within about 1 to about 3 cm. of the orifice plate.

FIG. 2 shows the receiving member in position below the orifice plate after an interruption of production of glass fibers. As can be seen, the receiving member is spaced apart from the orifice secton 12 of the glass fiber forming bushing. Molten glass material 15 is flooding across the undersurface of the bushing from orifices 14. Air cylinder 58 is in its retracted position. Rod 46 is held in position against stop 54 by the biased spring 50 attached at end 51.

As can be understood from FIG. 2, as air cylinder 58 acts on rod 56, the receiving member will move directly below the orificed area of the bushing until end 51 contacts stop 52. At that time the receiving member will move through an arc away from the orifice section of the bushing as rod 46 pivots downwardly around pivot point 48.

Figure 4:
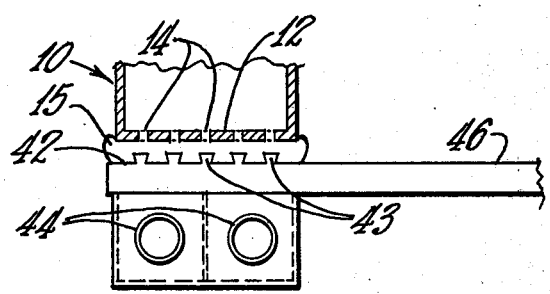
FIG. 4 is a side elevational view of a start-up device positioned below a bushing with heat-softened glass material flowing into the space between the bushing and the device.
Figure 5:
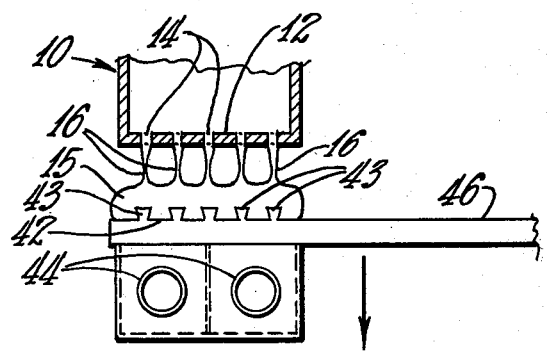
FIG. 5 is a side elevational view of the start-up device moving away from the bushing to attenuate fibers.

FIGS. 3, 4 and 5 show the device during start-up of the fiber forming operation.

FIG. 3 shows the start-up device in position in spaced-apart relationship immediately below the orifice plate 12 of the bushing. The receiving member or plate 42 is shown with the roughed or knurled, glass-engaging surface 43. Also positioned in contact with the receiving member is the cooling means 44. As shown, the cooling means can comprise a set of water cooled pipes. Fiber forming has not begun and the molten glass material 15 passing through orifices 14 is flooded across the orifice area of the base plate.

As shown in FIG. 4, the heat-softened glass continues to flow through the orifice plate to form a body of heat-softened glass between the receiving member and the orifice plate and in contact with the receiving member. As shown, the body of glass substantially fills the space between the receiving member 42 and the orifice plate 12.

FIG. 5 illustrates the receiving member with the joined body of glass moving from the orificed plate at a rate effective to form fibers. The body of glass is joined to, or engaged by, the receiving member. In the embodiment shown, the glass is joined to the member by having the heat-softened glass material adhere to the roughened or knurled surface of the receiving member. Heat is conveyed from the cooling means to insure solidification of the portion of the glass body contacting the receiving member. As can be seen, the receiving member and the orifice plate are in parallel relationship as the receiving member moves downwardly from the orificed plate. The receiving member moves the body of glass downwardly from the orifice plate at a velocity at which fibers are formed. As shown, the body of glass is moved away from the orifice plate at a velocity greater than the velocity of the glass flowing through the plate.

After the receiving member has moved downwardly from the orifice plate at a rate effective to form fibers, the receiving member is rotated from beneath the bushing as shown in FIG. 1. The attenuated fibers are severed from the body of glass adhering to the receiving member. The attenuated fibers are then moved to winder apparatus for continued attenuation of the fibers and for collection of the fibers into packages.

Having described the invention in detail, it will be understood that such specifications are given for the sake of explanation. Various modifications and substitutions other than those cited may be made without departing from the scope of the invention as defined in the following claims.

INDUSTRIAL APPLICABILITY

The present invention would be useful in the mineral fiber forming art and, in particular, in the glass fiber forming art.

I claim:

1. A method of glass fiber production from a bushing of the type having an orifice plate with a plurality of closely-spaced orifices and a flat exterior surface comprising:
   a. moving a plate member into spaced-apart relationship immediately below the orifice plate of the bushing, the plate member being substantially parallel to and below the entire orifice area of the orifice plate;
   b. flowing heat-softened glass through the orifice plate to form a body of heat-softened glass between the plate member and the orifice plate and in engaging contact with the plate member; and
   c. moving the plate member with the engaged body of glass from the orifice plate at a rate effective to form fibers.

2. The method of claim 1, wherein the plate member is moving to within about 1 to about 3 cm. of the orifice plate.

3. The method of claim 1, wherein the plate member is moved to within about 1 cm. of the orifice plate.

4. The method of claim 1, wherein the heat-softened glass is flowed to substantially fill the space between the plate member and the orifice plate.

5. The method of claim 1, wherein the body of heat-softened glass is congealed at the plate member.

6. Apparatus for glass fiber production from a bushing of the type having an orifice plate with a plurality of closely-spaced orifices and a flat undersurface comprising:
   a. a plate member;
   b. means for moving the plate member into spaced-apart relationship immediately below the orifice plate of the bushing, the plate member being substantially parallel to and below the entire orifice area of the orifice plate;
   c. means for flowing heat-softened glass through the orifice plate to form a body of heat-softened glass between the plate member and the orifice plate and in engaging contact with the plate member; and
   d. means for moving the plate member with the engaged body of glass from the orifice plate at a rate effective to form fibers.

7. The apparatus of claim 6 comprising means for cooling the plate member.

8. The apparatus of claim 6, wherein the plate member has a knurled surface.

9. Method of starting fiber production of a glass fiber forming bushing of the type having an orifice plate with a plurality of closely-spaced orifices and a flat undersurface comprising;
   a. moving a plate member into spaced-apart relationship below the orifice plate of the bushing, the plate member being substantially parallel to and below the entire orifice area of the orifice plate;
   b. flowing heat-softened glass through the orifice plate to form a body of glass which substantially fills the space between the plate member and the orifice plate and adheres to the plate member; and
   c. moving the plate member and the body of glass in a downward direction to carry away the body of glass and to attenuate fibers from the glass flowing through the orifice plate.

10. The method of claim 9 including the steps of severing the attenuating fibers from the body of glass and moving the attenuating fibers to a winder apparatus for collection.

11. Apparatus for the manufacture of glass fibers from a tipless bushing having an orifice area with a plurality of orifices in flooding relationship comprising:
   a. a cooled plate adapted with a roughened surface;
   b. means for moving the plate into a position below the bushing such that the surface and the orifice area are in spaced apart relationship, the plate being substantially parallel to and below the entire orifice area;
   c. means for flowing glass through the orifices into engaging contact with the surface, the glass forming a body which generally fills the space between the surface and the orifice area; and
   d. means for moving the plate with the body of glass away from the orifice area to attenuate fibers from the bushing.

12. A method of manufacturing glass fibers from a tipless bushing having an orifice area with a plurality of orifices in flooding relationship comprising;
   a. moving a plate adapted with a glass-engaging surface into a position below the bushing such that the surface and the orifice area are in spaced apart relationship, the plate being substantially parallel to and below the entire orifice area;
   b. flowing glass through the orifices into engaging contact with the surface, the glass forming a body which generally fills the space between the surface and the orifice area; and
   c. moving the plate with the body of glass away from the orifice area to attenuate fibers from the bushing.

* * * * *

UNITED STATES PATENT AND TRADEMARK OFFICE
CERTIFICATE OF CORRECTION

PATENT NO. : 4,274,853
DATED : June 23, 1981
INVENTOR(S) : Terry J. Hanna

It is certified that error appears in the above—identified patent and that said Letters Patent is hereby corrected as shown below:

Column 4, line 60 should read:

is moved to within about 1 to about 3 cm. of the orifice

Signed and Sealed this

Eighth Day of September 1981

[SEAL]

Attest:

GERALD J. MOSSINGHOFF

Attesting Officer        Commissioner of Patents and Trademarks